United States Patent [19]

Butts

[11] Patent Number: 4,733,151

[45] Date of Patent: Mar. 22, 1988

[54] CONTROL SYSTEM FOR VIBRATION TESTING APPARATUS

[75] Inventor: Gary Butts, Huntington Beach, Calif.

[73] Assignee: Ling Electronics, Inc., Anaheim, Calif.

[21] Appl. No.: 55,459

[22] Filed: May 29, 1987

[51] Int. Cl.⁴ ............................................. G05D 15/00
[52] U.S. Cl. ................................... 318/645; 318/114; 318/481; 318/640; 364/558; 73/664
[58] Field of Search ............... 318/635, 645, 114, 640, 318/491, 480, 481; 364/558; 73/663, 664, 665

[56] References Cited

U.S. PATENT DOCUMENTS

| 4,049,997 | 9/1977 | McGhee | 73/664 X |
| 4,081,734 | 3/1978 | MacSpadden et al. | 318/645 |
| 4,187,456 | 2/1980 | von der Heide | 318/640 X |
| 4,297,888 | 11/1981 | Hirai et al. | 73/664 |
| 4,516,230 | 5/1985 | Goodloe et al. | 73/664 X |
| 4,622,503 | 11/1986 | Sundblom | 318/645 |

Primary Examiner—Benjamin Dobeck
Attorney, Agent, or Firm—Joseph V. Claeys; Joseph C. Sullivan

[57] ABSTRACT

A load support servomechanism circuit controls the armature of a shaker apparatus. The circuit includes a position sensor, peak detectors connected to outputs of the position sensor, an A/D converter connected to outputs of the peak detectors through a switching bank, a power supply and a microprocessor which provides clock, read, write and ready signals and which automatically controls the position of the armature through solenoids operating on an exhaust valve and a pressure valve. Manual operation of the shaker armature is also provided.

7 Claims, 2 Drawing Figures

CONTROL SYSTEM FOR VIBRATION TESTING APPARATUS

TECHNICAL FIELD

The present invention relates to a control system for regulating the position of the movable element of vibration testing apparatus.

BACKGROUND ART

There are a considerable number of vibration testing apparatus that are well-known in the prior art. Such apparatus is used to mechanically shake an item for the purpose of diagnostically testing responses to certain driving forces. The item is physically attached to a moving portion of the apparatus and when the apparatus is activated, the item is subjected to a variety of test conditions. The moving portion of the vibration testing apparatus is typically driven by a force which may be continuous, cyclical or impulsed. One class of such apparatus employs the use of an electromagnetic field between field and armature windings. Various driving signals are impressed across the armature winding to control the movement of the armature. For convenience, the movable member of the vibration testing apparatus may be referred to from time to time hereinafter simply as the armature.

In many of the prior art vibration testing apparatus springs or static air pressure systems were relied upon to center the armature between its axial displacement limits. However, such systems are proving inadequate to meet the present demands for heavier pay loads, increased armature displacement, and unsymmetrical shock and random wave forms.

DISCLOSURE OF INVENTION

It is an object of this invention to provide a simple and reliable control system for automatically maintaining the neutral operating position of the moving member of a vibration testing apparatus.

It is another objective of the present invention to allow an operator to preselect, or even change during operation, a neutral operating position of the moving member of the vibration testing apparatus.

It is a further object of the invention to provide a closed loop control system utilizing an optical array displacement transducer and an active air system to establish the neutral position of the armature in the absence of spring flexors or the like utilized in the prior art.

These and other objects of the invention will become apparent from the following description.

The control system of the present invention comprises an armature position sensor. Preferably the position sensor includes two physically opposed rows of photo-transistors and infra-red light emitting diodes positioned such that an increasing number of photo-transistors are driven into conductive saturation as the armature of the vibration testing apparatus is raised. The current from the position sensor is converted to a voltage proportional to armature position. The output of this converter is applied to a pair of peak detectors operative to detect positive and negative armature displacement peaks respectively. Under control of a microprocessor, the voltage output from these detectors is applied via an analog switch for application to an analog to digital (A/D) converter for digital scaling.

When a position correction is required, the microprocessor causes an appropriate valve to be opened by energizing respective air valve solenoids. The opening of a pressure valve operates to raise the armature while the opening of an exhaust valve causes the armature to be lowered.

A suitable power supply means supplies both the AC and DC voltages necessary to operate the system.

BEST MODE FOR CARRYING OUT THE INVENTION

Figure 1:
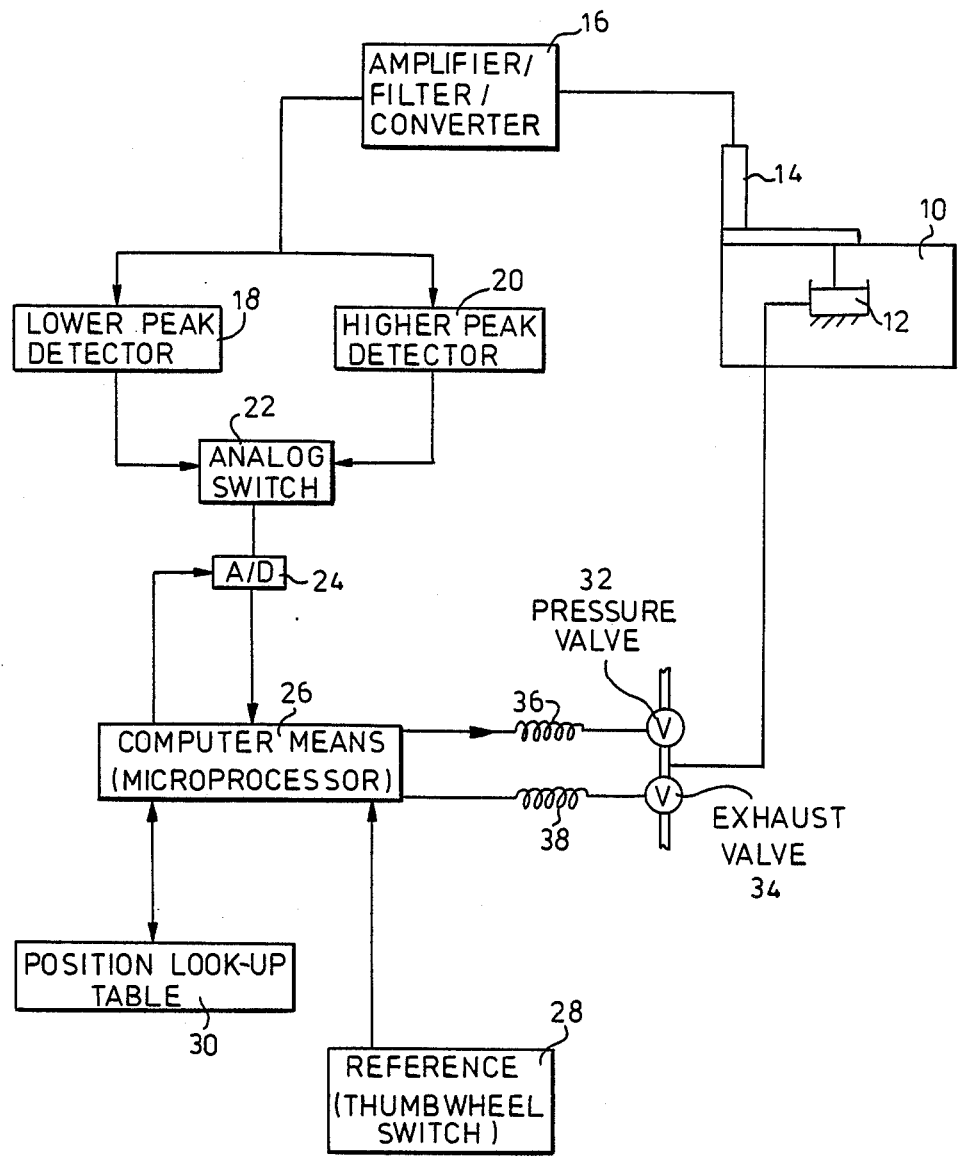
FIG. 1 is a block diagram of a system in accordance with this invention for controlling the position of the load support means of a vibration testing apparatus.

The general method of operation of the load support control system of this invention can be readily understood by reference to FIG. 1. As shown in FIG. 1, the control system includes means 14 for sensing the position of the load support means which is connected with the movable member, such as the armature, of a vibration testing apparatus 10. Vibration testing apparatus 10 is provided with a pneumatic cylinder means 12 connected to the armature. Preferably, position sensor means 14 is an optical sensor means employing a plurality of photo-transistors and light emitting diodes. The output of position sensing means 14 is a current signal proportional to the position of the armature.

The signal from the position sensor 14 is amplified, has noise removed and is converted from a current to a voltage by an amplifier/filter/converter means 16. The amplified, cleaned up and converted output of amplifier/filter/converter means 16 is applied to a lower peak detector 18 and a higher peak detector 20. Lower peak detector 18 provides an output which is proportional to the peak of the lower excursion of the armature while higher peak detector 20 provides an output which is proportional to the peak of the high excursion of the armature. Accordingly, the two outputs of peak detectors 18 and 20 are voltages which represent the highest and lowest peak displacement of the armature.

The outputs of the detectors 18 and 20 are conveyed to a suitable analog switch 22 the output of which is applied to an analog to digital (A/D) converter 24, which may be a conventional 8-bit converter. The A/D converter converts the analog voltage signal proportional to armature position to a digital number, which now represents the position of the armature in a form to be used by microprocessor 26, or other suitable computer means.

Microprocessor 26 can be a generic microprocessor with RAM outboard. In the particular arrangement shown and described in FIG. 2, an 8-bit, single chip microprocessor is used. With the various algorithms, system time constants, control characteristics and the like maintained within the microprocessors internal ROM. During operation the microprocessor 26 controls the operation of the control system, as well as, controlling access to the look-up table and making decisions about what to do with the information, and furnishing correct information is used to energize the solenoid coil of the proper valve (pressure or exhaust) to control the position of the armature. Thus, the control system operates to automatically provide timely and precise control of the armature position.

The analog switch 22 is controlled by the microprocessor 26 to select either the higher or lower peak detector output to be routed to the A/D converter 24. For example, microprocessor 26 can read the lower peak detector by first turning on analog switch 22 to route that output to the A/D converter 24 which converts it to a number. This number is read by microprocessor 26 and assumes it to be the lower peak. The microprocessor will then cause switch 22 to select the output of higher peak detector 20 to be routed to the A/D converter 24. The microprocessor then reads that number and assumes it to be the upper peak. Thus, the microprocessor has a number that represents the lower peak and a number which represents the higher or upper peak. It goes through a mathematical alogorithm to determine the average position based on the lower and higher peak excursions and compares that with a reference number, illustrated by block 28, representative of the desired armature position. The reference number can be provided in any suitable manner such as manually, in firmware or in software. In the arrangement described in more detail herein the reference number is provided manually by a thumbwheel switch which allows the operator to change the reference as desired.

The control system is also provided with a look-up table 30. Both the reference 28 and the look-up table 30 are shown as separate blocks, but either or both can be programmed in as firmware or in RAM as software.

The microprocessor 26 provides a signal to energize coil 36 to open pressure valve 32 if it has determined that the armature is too low. Alternatively, microprocessor 26 provides a signal to energize coil 38 to open exhaust valve 34 if it has determined that the armature is too high. For example, when pressure valve 32 is opened the high pressure (80 psi) air is applied to the pneumatic cylinder means 12 which caused the armature to be raised. Similarly, when exhaust valve 34 is opened the pneumatic cylinder is exhausted and the armature is allowed to fall to a lower position.

Figure 2:
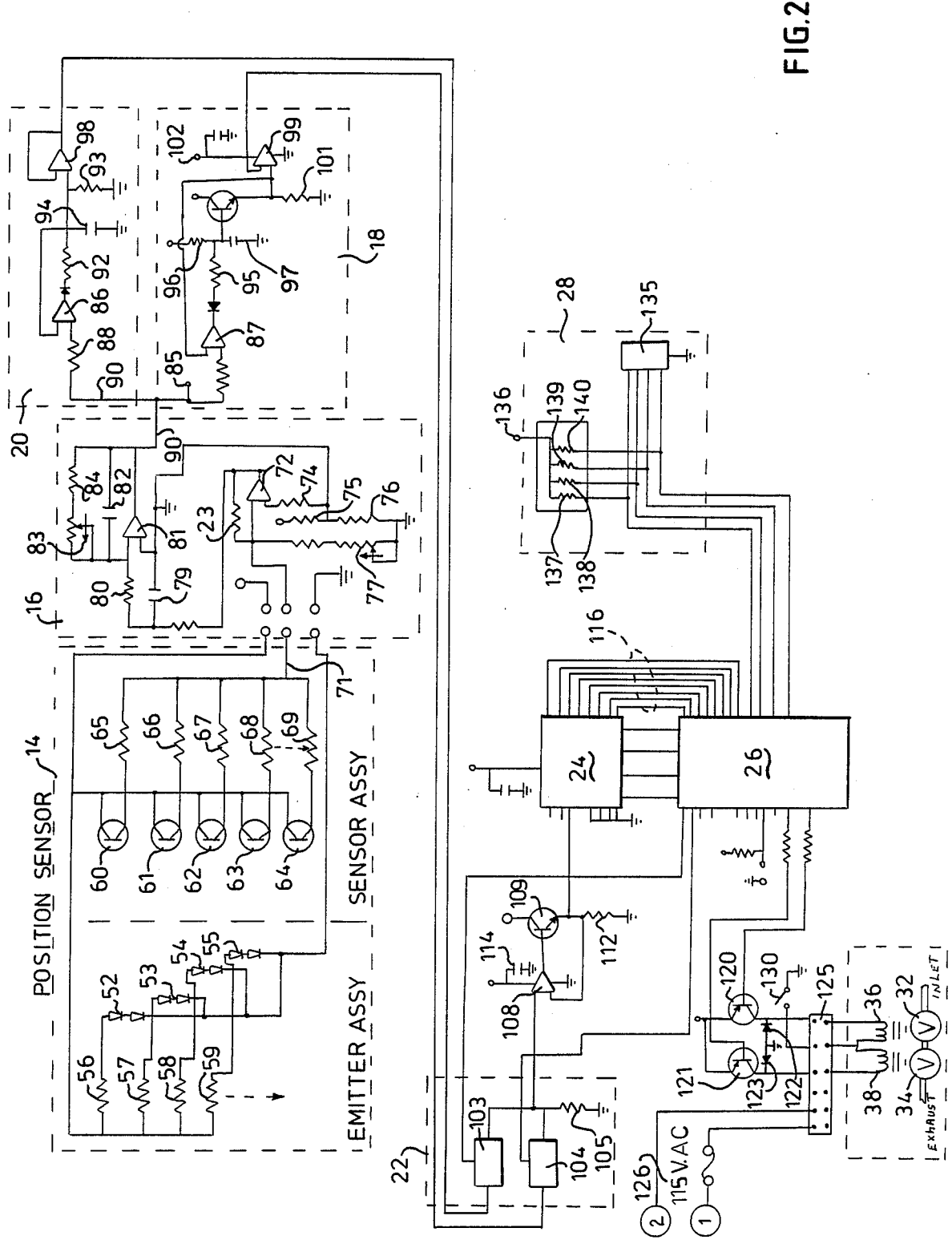
FIG. 2 shows a schematic circuit diagram of one embodiment of the position control system of the present invention.

FIG. 2 is a schematic circuit diagram of one embodiment of the system of this invention. As shown in FIG. 2, position sensor 14 comprises a plurality of light emitting diodes (LED) 52, 53, 54, 55, etc. respectively connected to resistors 56, 57, 58, 59, etc. provide light to a series of photo-transistors 60, 61, 62, 63, 64, etc. such that an increasing number of photo-transistors are driven into conductive saturation as the armature of the vibration testing apparatus is raised. The aforementioned detector transistors basically run in a "digital mode," i.e., either "on" or "off," to avoid drift with temperature, supply voltage, etc. Fringing of light around the end of a sensor blade (not shown) causes a finite voltage transition and therefore a smoother output current transfer function than would be realized without it. The output of the position sensor 14 is essentially a current proportional to the armature displacement. This current passes through resistors 65, 66, 67, 68, 69, etc., appears on line 71 and is conducted to the negative terminal of operational amplifier 72.

Amplifier 72, together with its associated resistors 73, 74, 75, and 76 acts as a buffer where the signal is converted to a voltage proportional to armature position. For example, an output voltage of about 5 volts can indicate a completely extended armature and nearly 0 volts can indicate a completely lowered armature. Potentiometer 77 may be used to establish an offset voltage of the amplifier. It may be adjusted, for example, to yield a voltage of 2.5±0.1 volts DC when the armature is mechanically constrained to the center of its operating range within 0.032 inches. The output of amplifier 72 is then applied to the active filter formed by capacitor 79, resistor 80, operational amplifier 81 and capacitor 82. The active filter is used to reduce noise by operating as a unity pass band, low pass filter. Potentiometer 83 acts through resistor 84 to establish the correct system gain to connect the circuitry to the exact sensor used on the vibration testing apparatus. The voltage generated by the active filter can be measured at terminal 85.

A pair of peak detectors 18 and 20 comprising operational amplifiers 86 and 87 effect positive and negative armature displacement peaks, respectively. The positive input terminal of operational amplifier 86 receives a displacement signal from terminal 90 through resistor 88. Likewise, the positive terminals of both amplifiers 86 and 87 receive the signal from the output terminal of operational amplifier 81. The time constant for each of the respective operational amplifiers 86 and 87 is determined by resistor 92, 93, and capacitor 94; and by resistor 95, 96 and capacitor 97, respectively. The peak voltages detected lie between 0 and 5 volts and are buffered by operational amplifiers 98 and 99. It should also be noted that the positive input terminal of operational amplifier 99 is connected to ground through resistor 101. Operational amplifier 98 is connected to ground through resistor 93 and also through capacitor 94. Terminal 102 provides a positive 12 volt input to the operational amplifier 99. The respective output voltages of the operational amplifiers 98 and 99 are conducted to an analog switch 22 comprising switches 103 and 104. Switches 103 and 104 have a common connection to ground through resistor 105.

Under the direct control of microprocessor 26, the output voltage of switches 103 and 104 are individually switches to an A/D input buffer formed by operational amplifier 108 and transistor 109. The negative terminal of operational amplifier 108, as well as the emitter of transistor 109, are connected to ground through resistor 112. There is an additional ground connection for the operational amplifier 108 and also a connection to ground through capacitor 114. There is also a direct 12 volts DC connection to operational amplifier 108. The output voltage from the aforementioned A/D input buffer is conveyed to an eight bit analog to digital converter 24. The A/D converter 24 has a connection to a 5 volt DC source and a connection to ground through capacitor 115. The input signal to analog to digital converter 24 is scaled to provide a digital signal between 0 and 5 volts. After the digital conversion, the data is transferred to the microprocessor 26 via an eight bit parallel bus indicated generally as lines 116. The A/C clock requirements are supplied by the microprocessor, and read, write, and ready functions are also directly wired from the microprocessor 26 to the A/D converter 24 as shown.

When a position correction is required, the microprocessor 26 opens the appropriate valve 32 or 34 (exhaust valve 34 to lower the armature, pressure valve 32 to raise the armature). For example, by lowering the voltage on terminal E below one volt exhaust valve 34 is caused to open, while lowering the voltage on terminal P pressure valve 32 is caused to open. The air valve solenoid coils 36 and 38 operate at 5 volts to open the pressure or exhaust valves 32 or 34, respectively. The current required for solenoid coils 36 and 38 is respectively supplied by transistors 120 and 121, in conjunction with diode 122 and 123 and switching bus 125. Switching bus 125 also has a 115 volt AC input 126 as shown.

The action of the control circuit is complex and involves long time-constant wait states. The basic operation achieves the objective of having the appropriate valve opened while the armature position is retreating from the desired operating point. When the retreat has been arrested, a correction is calculated and the appropriate valve is held open long enough to correct for the armature position error (25 milliseconds to 1 second). This is followed by a relatively long (1–10 seconds) wait state to allow for the armature to react to the changed air pressure through the amplifier damping. A switch 130 is connected to the valves 32 and 34 and controls the system by determining whether operation is to be automatic or manual. If the operation is to be automatic, a 16 position push-wheel switch 135 located on the cover of the electrical box controls the armature position reference. Switch 135 has four digital outputs and thus is able to provide digital inputs representing 16 positions to microprocessor 26. The connections to the microprocessor 26 also have a DC input from terminal 136 through resistors 137–140. Relative operating ranges of the shaker are represented by the sixteen positions available on this switch and the control system will cause the armature to be moved to the position indicated on the switch. The positions are represented by hexidecimal digits (0–9, A–F) with the lower numbers representing lower armature positions. A switch 130 can be moved at any time during operation at the discretion of the operator to change the system from manual to automatic operation and vice versa. If the manual switch 130 is activated, the control system is disabled and the then current position of the armature is maintained but not controlled and therefore subject to drift due to temperature, load variation, etc. In this mode of operation, push buttons located on the air valve assembly can be manually actuated to raise or lower the armature. These push buttons can be manually activated at any time but will be countered by the control system if it is in the active or automatic mode.

The foregoing described control system for vibration testing apparatus allows for preselection (as well as a change during operation) of the neutral operating position of the armature of the vibration testing apparatus. The armature may be readily biased to match any particular fixture height as well as to allow for unsymmetrical shock pulses or the like. That is, the system will automatically bias the armature to compensate for deflection due to increased or decreased load during operation as well as unsymmetrical waveform and the like, to maintain the peak excursions of the armature displacement within desired operating limits.

Although a prferred embodiment has been disclosed and described in detail herein, it should be understood that the scope of this invention is to be determined by the appended claims.

I claim:

1. A load support servomechanism for a shaker apparatus circuit comprising:
    a position sensor which provides a current proportional to the position of an armature of said shaker apparatus;
    a pair of peak detectors connected to an output of said position sensor which output has said proportional current flowing therethrough;
    a bank of switches with individual switches of said bank of switches connected to respective buffered outputs of said peak detectors;
    an A/D converter connected to a buffered output of said bank of switches;
    a microprocessor which receives inputs from said A/D converter over a bus and which conveys clock, read and write signals to said A/D converter;
    a power supply which comprises means for generating AC and DC voltage and which has an AC voltage connection to said switching bus and DC connections to said A/D converter, said microprocessor, and to a buffer circuit which produces said buffered output of said bank of switches; and
    a pair of amplifying and switching means converted to respective outputs of said microprocessor and to a DC voltage source.

2. The load support servomechanism circuit of claim 1, wherein said position sensor comprises a plurality of pairs of one or more light emitting diodes and one phototransistor with each element of said plurality of pairs being physically opposite each other and positioned such that an increasing number of phototransistors are driven into conductor saturation as said shaker armature is raised.

3. The load support servomechanism circuit of claim 1, wherein said pair of peak detectors comprise a pair of operational amplifiers.

4. The load support servomechanism circuit of claim 1, wherein said pair of amplifying and switching means comprises a pair of transistors.

5. The load support servomechanism circuit of claim 1, wherein said pair of switching means comprises a pair of solenoids.

6. The load support servomechanism circuit of claim 1, further comprising a switch connected to said switching bank for providing optional manual operation of said armature.

7. The load support servomechanism circuit of claim 1, further comprising a switch connected to said microprocessor and controlling a reference point for the armature by conveying digital signals representative of a plurality of armature positions to said microprocessor.

* * * * *